US010572104B2

(12) United States Patent
Shin et al.

(10) Patent No.: US 10,572,104 B2
(45) Date of Patent: Feb. 25, 2020

(54) ELECTRONIC DEVICE FOR EXECUTING A PLURALITY OF APPLICATIONS AND METHOD FOR CONTROLLING THE ELECTRONIC DEVICE

(71) Applicant: Samsung Electronics Co., Ltd., Gyeonggi-do (KR)

(72) Inventors: Dong-Jun Shin, Seoul (KR); Han-Ju Cho, Seoul (KR); Ji-Eun Yang, Seoul (KR); Eun-Ju Lee, Seoul (KR)

(73) Assignee: Samsung Electronics Co., Ltd (KR)

( * ) Notice: Subject to any disclaimer, the term of this patent is extended or adjusted under 35 U.S.C. 154(b) by 808 days.

(21) Appl. No.: 14/950,954

(22) Filed: Nov. 24, 2015

(65) Prior Publication Data

US 2016/0147388 A1 May 26, 2016

(30) Foreign Application Priority Data

Nov. 24, 2014 (KR) ........................ 10-2014-0164500

(51) Int. Cl.

*G06F 3/0482* (2013.01)
*G06F 3/01* (2006.01)
*G06F 3/0488* (2013.01)
*G06F 3/0484* (2013.01)

(52) U.S. Cl.

CPC ............ *G06F 3/0482* (2013.01); *G06F 3/013* (2013.01); *G06F 3/04842* (2013.01); *G06F 3/04883* (2013.01); *G06F 3/04886* (2013.01); *G06F 2203/04803* (2013.01)

(58) Field of Classification Search

CPC .................................................... G06F 3/0482
USPC .......................................................... 715/728
See application file for complete search history.

(56) References Cited

U.S. PATENT DOCUMENTS

2008/0037416 A1 2/2008 Jeong et al.
2012/0105348 A1 5/2012 Lampell et al.
2012/0257035 A1 10/2012 Larsen
2013/0054576 A1 2/2013 Karmarkar et al.
2013/0120295 A1 5/2013 Kim et al.
2013/0300684 A1 * 11/2013 Kim ...................... G06F 3/0488 345/173
2013/0332881 A1 12/2013 Yook et al.

(Continued)

FOREIGN PATENT DOCUMENTS

CN 102243889 11/2011
CN 102749990 10/2012

(Continued)

OTHER PUBLICATIONS

Kumar, Gaze-Enhanced User Interface Design, May 2007, pp. cover, ii, ix-xiii, 53, 56-58, 69, 92, 110, 111, 115, 116, and 124 (Year: 2007).*

(Continued)

*Primary Examiner* — Jennifer N To
*Assistant Examiner* — Amy P Hoang
(74) *Attorney, Agent, or Firm* — The Farrell Law Firm, P.C.

(57) ABSTRACT

An electronic device for executing a plurality of applications and a method for controlling the electronic device are provided. The method includes determining a first application related to an acquired user input from among the plurality of applications, and executing a task corresponding to the user input in the first application.

21 Claims, 15 Drawing Sheets

(56) References Cited

U.S. PATENT DOCUMENTS

| | | | |
|---|---|---|---|
| 2014/0100850 A1 | 4/2014 | Won | |
| 2014/0149927 A1 | 5/2014 | Yoon | |
| 2014/0184530 A1 | 7/2014 | Hyun | |
| 2014/0184550 A1 * | 7/2014 | Hennessey | G06F 3/013 345/173 |
| 2014/0267400 A1 * | 9/2014 | Mabbutt | G06T 19/006 345/633 |
| 2014/0282272 A1 | 9/2014 | Kies et al. | |

FOREIGN PATENT DOCUMENTS

| | | |
|---|---|---|
| CN | 103853424 | 6/2014 |
| EP | 2 166 437 | 3/2010 |
| KR | 1020100107377 | 10/2010 |
| KR | 1020130054073 | 5/2013 |
| KR | 1020140045181 | 4/2014 |
| KR | 1020140088676 | 7/2014 |
| KR | 1020140090883 | 7/2014 |

OTHER PUBLICATIONS

European Search Report dated Oct. 9, 2017 issued in counterpart application No. 15863801.5-1879, 8 pages.
International Search Report dated Mar. 3, 2016 issued in counterpart application No. PCT/KR2015/012679, 9 pages.
Chinese Office Action dated May 30, 2019 issued in counterpart application No. 201580063573.1, 23 pages.

* cited by examiner

ELECTRONIC DEVICE FOR EXECUTING A PLURALITY OF APPLICATIONS AND METHOD FOR CONTROLLING THE ELECTRONIC DEVICE

PRIORITY

This application claims priority under 35 U.S.C. § 119(a) to a Korean patent application filed in the Korean Intellectual Property Office on Nov. 24, 2014 and assigned Serial No. 10-2014-0164500, the entire content of which is incorporated herein by reference.

BACKGROUND

1. Field of the Disclosure

The present disclosure relates to an electronic device for executing a plurality of applications, and a method for controlling the electronic device.

2. Description of the Related Art

Due to the increased performance of central processing units (CPUs) in various devices, electronic devices are able to provide multi-tasking environments, in which users can execute multiple tasks together. For multi-tasking, N windows, each corresponding to an executing application, are displayed. Although, in a single task environment, a task cannot be executed during execution of another task in progress, in a multi-tasking environment, the task can be executed, without waiting for termination of the other task.

In order to perform multi-tasking in an electronic device that displays windows each corresponding to an executing application, a user selects a window for executing a task and the electronic device executes the user-selected task. This operation is repeated. Accordingly, the user manipulates the applications executed in the windows sequentially, rather than simultaneously.

SUMMARY

An aspect of the present disclosure is to address at least the above-mentioned problems and/or disadvantages and to provide at least the advantages described below. Accordingly, an aspect of the present disclosure is to provide an electronic device for executing a plurality of applications, and a method for controlling the electronic device.

In accordance with an aspect of the present disclosure, a method for controlling an electronic device that executes a plurality of applications is provided. The method includes determining a first application related to an acquired user input from among the plurality of applications, and executing a task corresponding to the user input in the first application.

In accordance with another aspect of the present disclosure, an electronic device is provided. The electronic device includes a touch screen configured to display a plurality of applications being executed, and a controller configured to determine a first application related to an acquired user input from among the plurality of applications, and to control execution of a task corresponding to the user input in the first application.

In accordance with another aspect of the present disclosure, a method for controlling an electronic device that executes a plurality of applications is provided. The method includes executing a first application in a foreground and executing a second application in a background, acquiring a user input, and executing a task corresponding to the user input in the second application in the background.

In accordance with another aspect of the present disclosure, an electronic device is provided. The electronic device includes a touch screen configured to display a first application being executed in a foreground and a second application being executed in a background, and a controller configured to acquire a user input and to control execution of a task corresponding to the user input in the second application in the background.

BRIEF DESCRIPTION OF THE DRAWINGS

The above and other aspects, features and advantages of certain embodiments of the present disclosure will be more apparent from the following description taken in conjunction with the accompanying drawings, in which.

DETAILED DESCRIPTION

Figure 1:
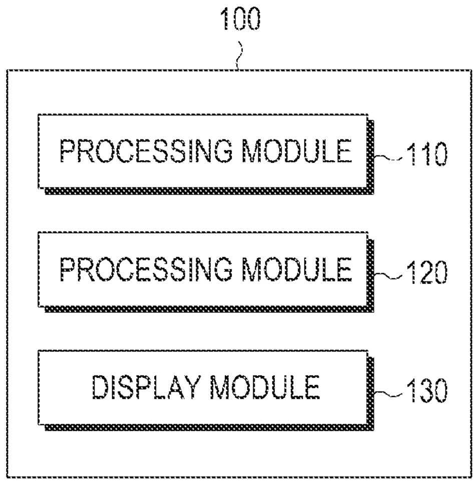
FIG. 1 is a block diagram of an electronic device for executing a plurality of applications according to an embodiment of the present disclosure.

Hereinafter, embodiments of the present disclosure are described with reference to the accompanying drawings. However, the scope of the present disclosure is not limited to the particular embodiments, and all modifications, equivalents, and/or alternatives thereto are also within the scope and spirit of the present disclosure. Throughout the drawings, like reference numerals may refer to the same or similar parts, components, and structures.

In the present disclosure, the terms 'have', 'may have', 'include', or 'may include' signify the presence of a specific feature (e.g., a number, a function, an operation, or a component like a part), but do not exclude the presence of additional features.

In the present disclosure, the terms 'A or B', 'at least one of A or/and B', or 'one or more of A or/and B' may cover all possible combinations of the enumerated items A and B. For example, 'A or B', 'at least one of A and B', or 'at least one of A or B' may represent all of (1) inclusion of at least one A, (2) inclusion of at least one B, and (3) inclusion of at least one A and at least one B.

Terms such as 'first' or 'second', as used herein, may modify the names of various components irrespective of sequence and/or importance, without limiting the components. These expressions may be used to distinguish one component from another component. For example, a first user equipment (UE) and a second UE may indicate different UEs irrespective of a sequence of the UEs or relative importance of the UEs. For example, a first component may be referred to as a second component, and vice versa, without departing the scope of the present disclosure.

Herein, when a component (e.g., a first component) is described as being 'operatively or communicatively coupled with/to' or 'connected to' another component (e.g., a second component), the one component may be connected to the other component directly or through any other component (e.g., a third component). On the other hand, when a component (e.g., a first component) is described as being 'directly connected to' or 'directly coupled to' another component (e.g., a second component), no other components (e.g., a third component) are located between the components.

The term 'configured to', as used herein, may be replaced with, e.g., the term 'suitable for' 'having the capacity to', 'designed to', 'adapted to', 'made to', or 'capable of' under circumstances. The term 'configured to' may not necessarily mean 'specifically designed to' in hardware. Instead, the term 'configured to' may mean that a device 'capable of' performing an operation together with another device or part. For example, 'a processor configured to execute A, B, and C' may refer to a dedicated processor (e.g., an embedded processor) for performing the corresponding operations or a generic-purpose processor (e.g., a central processing unit (CPU) or an application processor (AP)) for performing the corresponding operations.

The terms as used herein are merely provided to describe specific embodiments, but do not limit the scope of other embodiments of the present disclosure. Herein, singular forms of terms include plural referents as well, unless the context clearly dictates otherwise. The terms and words including technical or scientific terms used in the following description and claims may have the same meanings as generally understood by those skilled in the art. Terms that are defined in dictionaries may be interpreted as having the same or similar definitions as in the dictionaries or has having contextual definitions according to related technology. Unless otherwise defined, terms should not be interpreted as ideally or excessively formal definitions. Terms as defined in the present disclosure may not be interpreted as excluding embodiments of the present disclosure.

According to an embodiment of the present disclosure, an electronic device may be at least one of, e.g., a smartphone, a tablet personal computer (PC), a mobile phone, a video phone, an e-book reader, a desktop PC, a laptop PC, a netbook computer, a workstation, a server, a personal digital assistant (PDA), a portable multimedia player (PMP), an MPEG-1 audio layer-3 (MP3) player, a mobile medical equipment, a camera, and a wearable device (e.g., smart glasses, a head-mounted Device (HMD), electronic clothes, an electronic bracelet, an electronic necklace, an electronic appcessory, an electronic tattoo, a smart mirror, or a smart watch).

According to an embodiment of the present disclosure, an electronic device may be embodied as a smart home appliance. For example, the smart home appliance may be at least one of a television (TV), a digital versatile disk (DVD) player, an audio player, a refrigerator, an air conditioner, a vacuum cleaner, an oven, a micro oven, a washer, an air purifier, a set-top box, a home automation control panel, a security control panel, a TV box, a game console, an electronic dictionary, an electronic key, a camcorder, and an electronic picture frame.

According to other embodiments of the present disclosure, an electronic device may be embodied as at least one of a medical device (e.g., a portable medical meter such as a blood glucose meter, a heart rate meter, a blood pressure meter, or a body temperature meter, a magnetic resonance angiography (MRA) device, a magnetic resonance imaging (MRI) device, a computed tomography (CT) device, an imaging device, an ultrasonic device, or the like), a navigation device, a global positioning system (GPS) receiver, an event data recorder (EDR), a flight data recorder (FDR), an automotive infotainment device, a naval electronic device (e.g., a naval navigation device, a gyrocompass, or the like), an avionic electronic device, a security device, an in-vehicle head unit, an industrial or consumer robot, an automatic teller machine (ATM) in a financial facility, a point of sales (POS) device in a shop, an Internet of Things (IoT) device (e.g., a light bulb, various sensors, an electricity or gas meter, a sprinkler, a fire alarm, a thermostat, a street lamp, a toaster, sports goods, a hot water tank, a heater, or a boiler), and the like.

According to some embodiments of the present disclosure, an electronic device may be embodied as, for example, at least one of furniture, part of a building/structure, an electronic board, an electronic signature receiving device, a projector, and various measuring devices (e.g., water, electricity, gas or electro-magnetic wave measuring devices). According to various embodiments of the present disclosure, an electronic device may be embodied as one of or a combination of two or more of the foregoing devices. According to some embodiments of the present disclosure, an electronic device may be a flexible electronic device. In addition, an electronic device according to an embodiment of the present disclosure is not limited to the foregoing devices and may include new electronic devices produced along with developments of technology.

With reference to the attached drawings, an electronic device according to various embodiments of the present disclosure will be described as follows. In the present disclosure, the term 'user' may refer to a person or device (e.g., an artificial intelligence electronic device) that uses an electronic device.

FIG. 1 is a block diagram of an electronic device 100 for executing a plurality of applications according to an embodiment of the present disclosure.

Referring to FIG. 1, the electronic device 100 includes at least a part of a processing module 110, an execution module 120, and a display module 130. The processing module 110, the execution module 120, and the display module 130 may be interconnected by a bus. The bus may include a circuit that provides communication (e.g., control messages and/or data) between components.

The electronic device 100 may execute a plurality of applications and display the executed applications. The electronic device 100 may display a respective window for each executed application. The electronic device 100 may execute a plurality of applications and display a result of execution of a task corresponding to a user input in a first application related to the user input.

The processing module 110 may determine the first application is an application related to the acquired user input from among the plurality of applications executed in the electronic device 100. The electronic device 100 may acquire a user input for task execution in the plurality of applications. The user input may include at least one of all types of inputs acquired through an input/output (I/O) interface of the electronic device 100, such as a touch input, a voice input, a gesture input, a pen input, and the like.

The I/O interface may transmit a command or data received from, for example, a user or another external device to one or more other components of the electronic device 100. The I/O interface may also output a command or data received from one or more other components of the electronic device 100 to the user or another external device.

However, the user input may be of a different type than an input type supported by an application being executed in the foreground in the electronic device 100. For example, if the application being executed in the foreground of the electronic device 100 supports a touch input, the user input may include at least one of the remaining input types other than touch input. Further, if the application being executed in the foreground of the electronic device 100 supports a voice input, the user input may include at least one of the remaining input types except for the voice input.

The execution module 120 may execute a task corresponding to the user input in the first application. The processing module 110 may determine the first application and allocate the user input to the first application. Thus, the execution module 120 may execute the task corresponding to the user input in the background in the first application.

For example, the execution module 120 may execute the task corresponding to the user input in the background in the first application, while maintaining a task of the application being executed in the foreground. To execute a task in the first application, the execution module 120 may execute the task corresponding to the user input without performing a procedure for selecting the first application.

If the processing module 110 is not able to determine which application is related to the user input, the display module 130 may display a pop-up window for selecting the first application related to the user input, for the user. For example, the display module 130 may display a pop-up window that enables selection of all of the plurality of applications or display a pop-up window that enables selection of at least a part of the plurality of applications.

For example, the display module 130 may be capable of displaying various types of content (e.g., text, image, icon, symbol, and the like) for the user. According to an embodiment of the present disclosure, the display module 130 may include a liquid crystal display (LCD), a light emitting diode (LED) display, an organic LED (OLED) display, a micro electromechanical systems (MEMS) display, or an electronic paper display. The display may include a touch screen and may receive, for example, a touch input, a gesture input, a proximity input, or a hovering input, for example, through an electronic pen or a user's body part.

According to an embodiment of the present disclosure, the processing module 110 may determine the first application using a database (DB) that maps user input to tasks executable in each of the plurality of applications, stored in a memory of the electronic device 100. A method for determining a first application using a database is described in greater detail later herein.

According to an embodiment of the present disclosure, the processing module 110 may detect an application to which the eyes of the user are directed among the plurality of applications by tracking the eyes of the user using an image recognition device, such as a camera of the electronic device 100. The processing module 110 may acquire an image of the face or eyes of the user through the camera and track the eyes of the user based on the distance between the electronic device 100 and the user. The processing module 110 may track the eyes of the user as described above, or acquire a result of tracking the eyes of the user from an additional module such as an eye tracking module.

The processing module 110 may detect the application to which the eyes of the user are directed using the acquired result of the eye-tracking and determine the first application, as described above. For example, the processing module 110 may determine the application the user is looking at from among the plurality of applications to be the first application when the user input is received.

Further, the processing module 110 may store detection histories of applications detected to have been looked at by the user for at least a predetermined time period in the memory of the electronic device 100. Thus, the processing module 110 may determine the first application to be an application that the user has looked at a greatest number of times for at least the predetermined time period from among the plurality of applications based on the detection history of the application. A method for determining a first application by tracking the eyes of a user is described in greater detail later herein.

According to an embodiment of the present disclosure, the processing module 110 may determine the first application based on an additional input indicating a predetermined application. For example, the processing module 110 may determine a specific application indicated by an additional input to be the first application. The additional input may be acquired when the user input is received, and the additional input may be predetermined to indicate the specific application according to the type of the input. The additional input may be of the same or different input type as the user input.

For example, a voice input 'PLAY' and a voice input 'MUSIC' may be acquired respectively as the user input and the additional input through the I/O interface of the electronic device 100. In this case, the processing module 110 may execute a music player execution task corresponding to the user input 'PLAY' in a music player application indicated by the additional input 'MUSIC'. A method for determining a first application using an additional input described in greater detail later herein.

According to an embodiment of the present disclosure, the processing module 110 may determine, as the first application, an application selected by the user in a pop-up window designed for selection of the first application, displayed on the display module 130. If the processing module 110 is not capable of determining the first application based on the user input, the processing module 110 may determine the first application according to a user selection of the application.

The processing module 110 and/or the execution module 120 may include one or more of a CPU, an application processor (AP), and a communication processor (CP). The processing module 110 and/or the execution module 120 may, for example, perform computation or data processing related to control and/or communication of at least one other component of the electronic device 100. The processing module 110 and/or the execution module 120 may be called a controller or incorporate a controller as a part of the processing module 110.

The processing module 110 and/or the execution module 120 may, for example, execute programs or applications that process commands or data related to at least one other component of the electronic device 100. The programs may include, for example, a kernel, middleware, an application programming interface (API), and/or application programs (or applications). At least a part of the kernel, the middleware, and the API may be referred to as an operating system (OS). The kernel may control or manage system resources (e.g., the bus, the processing module 110, the execution module 120, or the memory) that are used in executing operations or functions implemented in other programs (e.g., the middleware, the API, or the application programs). Also, the kernel may provide an interface for allowing the middleware, the API, or the application programs to access individual components of the electronic device 101 and thus control or manage system resources. The middleware may, for example, serve as a medium through which the kernel may communicate with the API or the application programs to transmit and receive data. Also, regarding one or more task requests received from the application programs, for example, the middleware may perform scheduling or load balancing for the one or more task requests by assigning priorities for using system resources of the electronic device to at least one of the application programs.

The API is an interface that may control functions that the application programs provide at the kernel or the middleware. For example, the API may include at least one interface or function (e.g., a command) for file control, window control, video processing, or problem control. Herein, an application may also be referred to as an application program.

Figure 2:
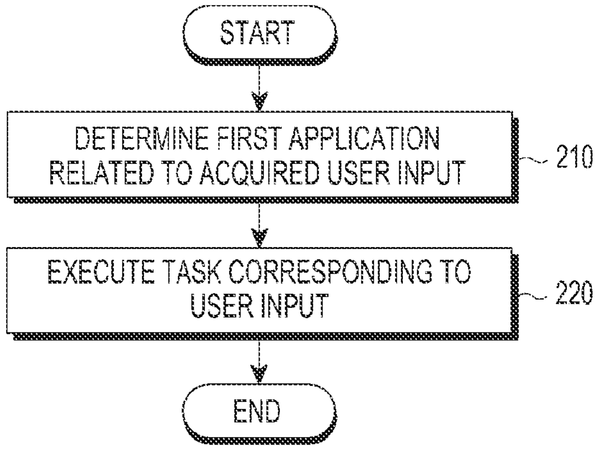
FIG. 2 is a flowchart illustrating a method for controlling an electronic device for executing a plurality of applications according to an embodiment of the present disclosure.

FIG. 2 is a flowchart illustrating a method for controlling an electronic device for executing a plurality of applications according to an embodiment of the present disclosure.

Referring to FIG. 2, the electronic device 100, which executes a plurality of applications, determines a first application related to an acquired user input, in step 210. The electronic device 100 may display the executed applications. The electronic device 100 may determine the first application related to the acquired user input from among the plurality of applications being executed for multi-tasking.

For example, the electronic device 100 may determine the first application using a DB in which tasks executed in the respective applications are mapped to user inputs. The electronic device 100 may also determine the first application by tracking the eyes of a user. The electronic device 100 may determine the first application by acquiring an additional input indicating a specific application from the user or according to a user selection. A method for determining a first application will be described later in greater detail with reference to FIG. 3.

In step 220, the electronic device 100 executes a task corresponding to the user input in the first application. The electronic device 100 may allocate the user input to the first application and execute the task in the first application.

In this manner, the electronic device 100 may execute a task in an application other than an application of an on-going task, while also maintaining the on-going task. The electronic device 100 may also execute the task corresponding to the user input in the first application without receiving a separate selection of the first application by determining the first application as an application related to the user input.

Figure 3:
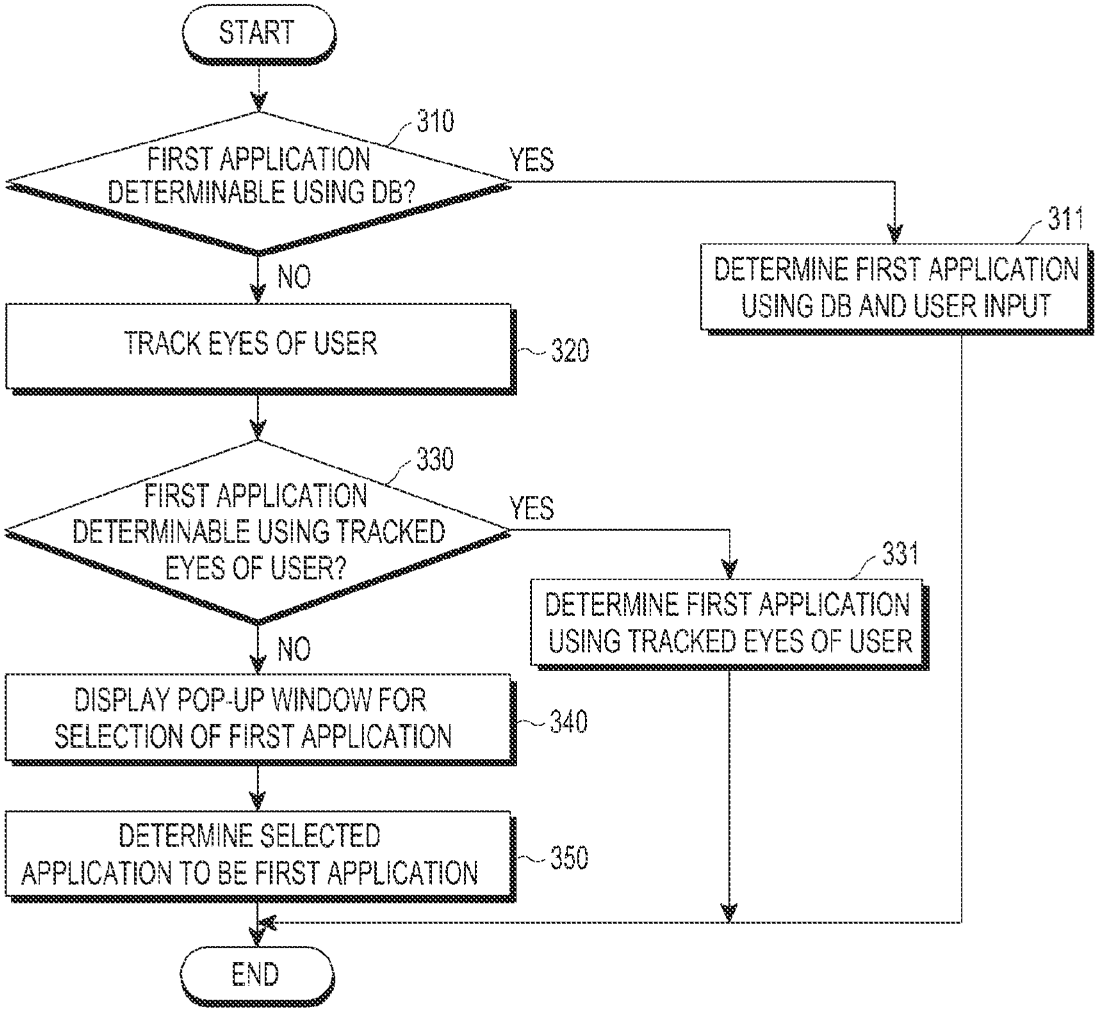
FIG. 3 is a flowchart illustrating an operation for determining a first application related to a user input according to an embodiment of the present disclosure.

FIG. 3 is a flowchart illustrating an operation for determining a first application related to a user input according to an embodiment of the present disclosure.

Referring to FIG. 3, the electronic device 100 determines whether the electronic device 100 is able to determine a first application using a DB having user inputs mapped to tasks executed in a plurality of applications, stored in the memory in step 310.

According to an embodiment of the present disclosure, the electronic device 100 may store a DB in which user inputs are mapped to tasks executable in a plurality of applications, as illustrated in Table 1.

TABLE 1

| Application | Task | User input |
|---|---|---|
| First application | First task | First user input |
| Second application | Second task | Second user input |
| Third application | Third task | Third user input |

For example, upon acquisition of a second user input, the electronic device 100 may determine that an application corresponding to the second user input is a second application. The electronic device 100 may execute a second task in the determined second application. Particularly, along with the acquisition of the second user input, the electronic device 100 may execute the second task in the background, even though the first application is being executed in the foreground.

According to another embodiment of the present disclosure, the DB may have user inputs mapped per task or task set executable in the electronic device 100 and may be stored, as illustrated in Table 2.

TABLE 2

| Application | Screen in application | Task | User input |
|---|---|---|---|
| First application | First screen | First task | First user input |
| | | Second task | Second user input |
| | | | Third user input |
| | | . . . | . . . |
| | Second screen | First task | Fourth user input |
| | | | Fifth user input |
| | | | Sixth user input |
| | | Second task | Seventh user input |

TABLE 2-continued

| Application | Screen in application | Task | User input |
|---|---|---|---|
| | | | Eighth user input |
| | | . . . task | . . . user input |
| | . . . screen | . . . task | . . . user input |
| Second application | First screen | First task | Ninth user input |
| . . . | . . . | . . . | . . . |
| $N^{th}$ application | First screen | First task | Tenth user input |
| | . . . screen | . . . task | . . . user input |

Referring to Table 2, the electronic device 100 may include a DB in which tasks executable on each screen provided by each application being executed in the electronic device 100 are classified. A screen may refer to an application execution screen. For example, the first application may display a first screen or a second screen. Even though the same application is executed, a different task or task set mapped to a user input may be stored according to a screen. Each task may be stored mapped to at least one user input. For example, a first task executed on a second screen of the first application may be mapped to at least one of fourth, fifth, and sixth user inputs.

For example, upon acquisition of a first user input, the electronic device 100 may detect the first task executed on a first screen of a first application, which is mapped to the first user input. Thus, the electronic device 100 may determine the first application to be an application related to the first user input.

If an additional application is executed, a user input mapped to each task executable in the added application may be updated. Further, in order to acquire a user input mapped to a task executed in the added application, the electronic device 100 may activate a related sensor, so that the sensor may periodically sense a user input, with low power, through a sensor hub (i.e., a low-power sensor controller).

To increase a speed of detecting a task mapped to a user input, the electronic device 100 may filter necessary data from the whole DB, in real time, according to a change in screens displayed in a plurality of applications being executed. For example, if a first screen is being displayed in application A, the electronic device 100 may filter the remaining data except for data related to the first screen, for example, data related to a second screen and data related to a third screen. Thus, the electronic device 100 may increase the speed of detecting a task mapped to a user input.

According to another embodiment of the present disclosure, the electronic device 100 may store a DB of correlations among all stored applications, tasks, and user inputs. The electronic device 100 may determine an application related to an acquired user input using the stored DB.

The electronic device 100 may detect a task mapped to a user input using the DB. If one or more tasks are detected and executed in a single application, the electronic device 100 may determine the first application using the DB.

However, if a plurality of tasks are detected and executed in a plurality of applications, it is possible that the electronic device 100 may not be able to determine the first application using the DB. Therefore, the electronic device 100 may determine whether it is possible to determine the first application by searching for a task mapped to an acquired user input using the DB.

According to another embodiment of the present disclosure, if a plurality of detected tasks is executed in a plurality of applications, the electronic device 100 may determine all of the plurality of applications to be related to the user input and may control each of the plurality of applications to execute a task.

According to another embodiment of the present disclosure, the electronic device 100 may directly determine an application corresponding to an acquired user input using the DB. For example, the electronic device 100 may directly determine the application related to the user input without performing a procedure for searching for a task corresponding to the acquired user input.

If it is possible to determine the first application using the DB, the electronic device 100 determines the first application based on the DB and the acquired user input, in step 311. As described above, the electronic device 100 may detect a task mapped to the acquired user input using the DB. The electronic device 100 may determine an application that executes the detected task to be the first application.

For example, upon acquisition of a voice input ‘STOP’ from the user, the electronic device 100 may detect a task mapped to the voice input ‘STOP’ in the DB. If the task mapped to the voice input ‘STOP’ is detected and an application executing the task is a music player application, the electronic device 100 may determine the music player application to be the first application.

According to another embodiment, if the task mapped to the voice input ‘STOP’ is detected and the music player application and a media player application execute the task, the electronic device 100 may determine both the music player application and the media player application to be first applications.

According to another embodiment of the present disclosure, the electronic device 100 may determine an application corresponding to the voice input ‘STOP’, without searching for a task mapped to the voice input ‘STOP’. The electronic device 100 may determine that the determined application is the first application.

In step 320, if it is not possible to determine the first application using the DB, the electronic device 100 tracks the eyes of the user. The electronic device 100 may acquire an image of the face or eyes of the user through a camera. The electronic device 100 may track the eyes of the user based on the image of the face or eyes of the user and the distance between the electronic device 100 and the user.

In step 330, the electronic device 100 determines whether the electronic device 100 is able to determine the first application based on the tracked eyes of the user. The electronic device 100 may detect an application to which the tracked eyes of the user are directed. As described before, the electronic device 100 may determine the application detected by tracking the eyes of the user to be the first application related to the acquired user input.

However, if the application detected by tracking the eyes of the user is being executed, if the movement of the eyes of the user is less than a predetermined threshold, or if the user looks at a location other than the electronic device 100, the electronic device 100 may not be able to determine the first application, despite performing user eye tracking. Accordingly, the electronic device 100 may track the eyes of the user and determine whether the electronic device 100 is able to determine the first application based on the tracked eyes of the user.

In step 331, if it is possible to determine the first application based on the tracked eyes of the user, the electronic device 100 determines the first application based on the tracked eyes of the user. For example, the electronic device 100 may determine that the first application is an application detected as being looked at by the user while acquiring the user input from among the plurality of applications. Further, to determine the first application using the tracked eyes of the user, the electronic device 100 may store detection histories of applications detected as being looked at by the user for at least a predetermined time period, in the memory of the electronic device 100. The electronic device 100 may determine the first application to be an application detected as being looked at by the user the greatest number of times according to the detection history of the application. A specific method for determining a first application based on a detection history in the electronic device 100 is described in greater detail later herein with reference to FIG. 4.

In step 340, if the electronic device 100 is not able to determine the first application based on the tracked eyes of the user, the electronic device 100 displays a pop-up window for selection of the first application on its display. To determine an application to be executed from among the plurality of applications in response to the user input, the electronic device 100 may receive a user selection through the pop-up window. To receive a user selection, the electronic device 100 may display the pop-up window as described above or output a voice that prompts the user to select the first application through a speaker.

In step 350, the electronic device 100 determines application selected through the pop-up window displayed in step 340 to be the first application. When the electronic device 100 outputs voice prompting the user to select the first application through the speaker, the electronic device 100 may receive a voice input indicating a selection for the first application and determine the selected application to be the first application based on the received voice input.

While the electronic device 100 may sequentially perform the operation for determining a first application related to a user input as described above, the electronic device 100 may perform the operation irrespective of the sequence. For example, the electronic device 100 may determine the first application by initially tracking the eyes of the user without using the DB. Upon acquisition of a user input, the electronic device 100 may determine the first application by providing the pop-up window.

While not shown in FIG. 3, the electronic device 100 may acquire an additional input indicating a predetermined application and determine the predetermined application indicated by the additional input to be the first application. A method for determining a first application based on an additional input in the electronic device 100 will be described later in greater detail.

Figure 4:
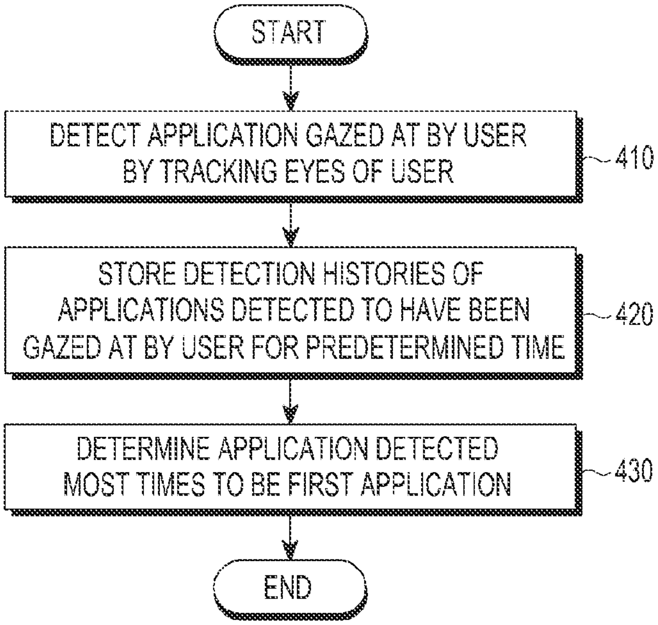
FIG. 4 is a flowchart illustrating an operation for determining a first application based on tracking the eyes of a user according to an embodiment of the present disclosure.

FIG. 4 is a flowchart illustrating an operation for determining a first application based on tracking the eyes of a user according to an embodiment of the present disclosure.

Referring to FIG. 4, the electronic device 100 detects an application to which the eyes of the user are directed by tracking the eyes of the user in step 410. As described herein above, the electronic device 100 may track the eyes of the user based on an acquired image of the face or eyes of the user and the distance between the electronic device 100 and the user. Thus, the electronic device 100 may determine a point of the display to which the eyes of the user are directed and detect an application displayed on the determined point.

In step 420, the electronic device 100 stores detection histories of applications detected to have been looked at by the user for at least a predetermined time period. Although the electronic device 100 may determine an application detected to be looked at by the user while acquiring a user input to be a first application, an unintended application may be determined to be the first application. Accordingly, to determine the first application more accurately, the electronic device 100 may store detection histories of applications detected to have been looked at by the user for at least a predetermined time period.

For example, if the eyes of the user have been directed to application A seven times, to application B twice, and to application C once, for at least a predetermined time period, the electronic device 100 may store the number of detections for each application as the detection history of the application.

Further, the electronic device 100 may additionally store a correlation between an ongoing task and an application executing the task as the detection history of the application. For example, the electronic device 100 may store the number of look detections separately according to whether application A or application B is executing an ongoing task at the time of detection. Thus, the electronic device 100 may induce a correlation between each application and a task and use the correlation in determining the first application.

In step 430, the electronic device 100 determines an application detected the greatest number of times as the first application. By performing the method according to FIG. 4, the electronic device 100 may determine the first application more accurately than other examples in which the electronic device 100 determines an application detected as being looked at by the user while acquiring a user input to be the first application.

If the ongoing application is application A, the electronic device 100 may determine the first application in consideration of correlations between application A and other applications based on the detection histories irrespective of the number of detections of application A.

For example, if application A is detected twice (i.e., if the number of detections for application A for at least the predetermined period of time is 2), application B is detected four times, and application C, and a task is being executed in application A, the first application may be determined as follows in the same manner as a scenario in which application B is detected three times and C is detected once. If the ongoing task is being executed in application A, the electronic device 100 may determine application B, which has been detected the greatest number of times, as the first application. Even though the total number of detections is greater for application C, the electronic device 100 may determine application B to be the first application related to the acquired user input, when further taking into account the correlation between application A and application B.

Figures 5A, 5B, 5C:
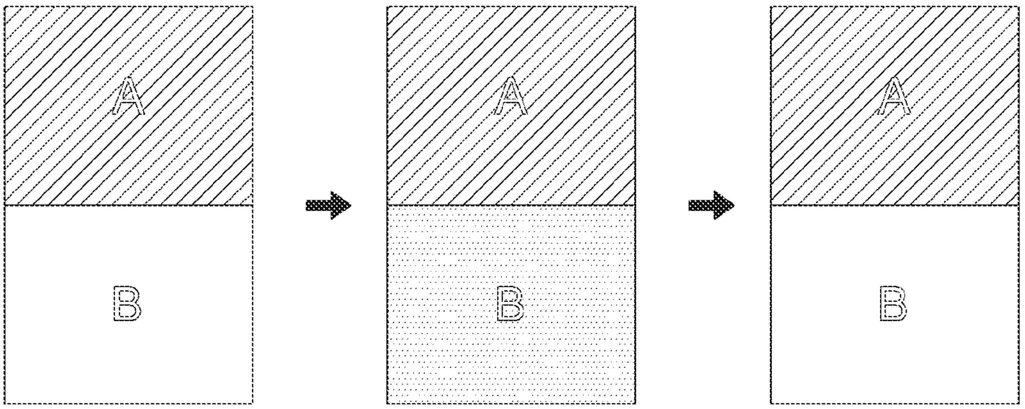
FIGS. 5A, 5B, and 5C are diagrams illustrating a conceptual view of a task processing operation according to an embodiment of the present disclosure.

FIGS. 5A, 5B, and 5C are diagrams illustrating conceptual views of a task processing operation according to an embodiment of the present disclosure.

As illustrated in FIG. 5A, the electronic device 100 may simultaneously execute application A and application B and display application A and application B in separate execution windows. FIG. 5A illustrates a case in which the electronic device 100 is executing a task in application A.

When the electronic device 100 is executing a task in application A as illustrated in FIG. 5A, the electronic device 100 may acquire a user input related to application B. Then, the electronic device 100 may determine that the acquired user input is related to application B and execute a task corresponding to the user input in application B, while maintaining execution of the task of application A without interruptions as illustrated in FIG. 5B.

As described before, the electronic device 100 may execute the task corresponding to the acquired user input in application B without performing a procedure for selecting application B.

FIG. 5C illustrates an example in which after the electronic device 100 executes the task corresponding to the user input in application B, the electronic device 100 keeps executing the task in application A. In this manner, the electronic device 100 may execute the task in application B, while maintaining execution of the task A.

FIGS. 6A, 6B, 6C, and 6D are diagrams illustrating a task processing operation according to an embodiment of the present disclosure.

Figures 6A, 6B, 6C, 6D:
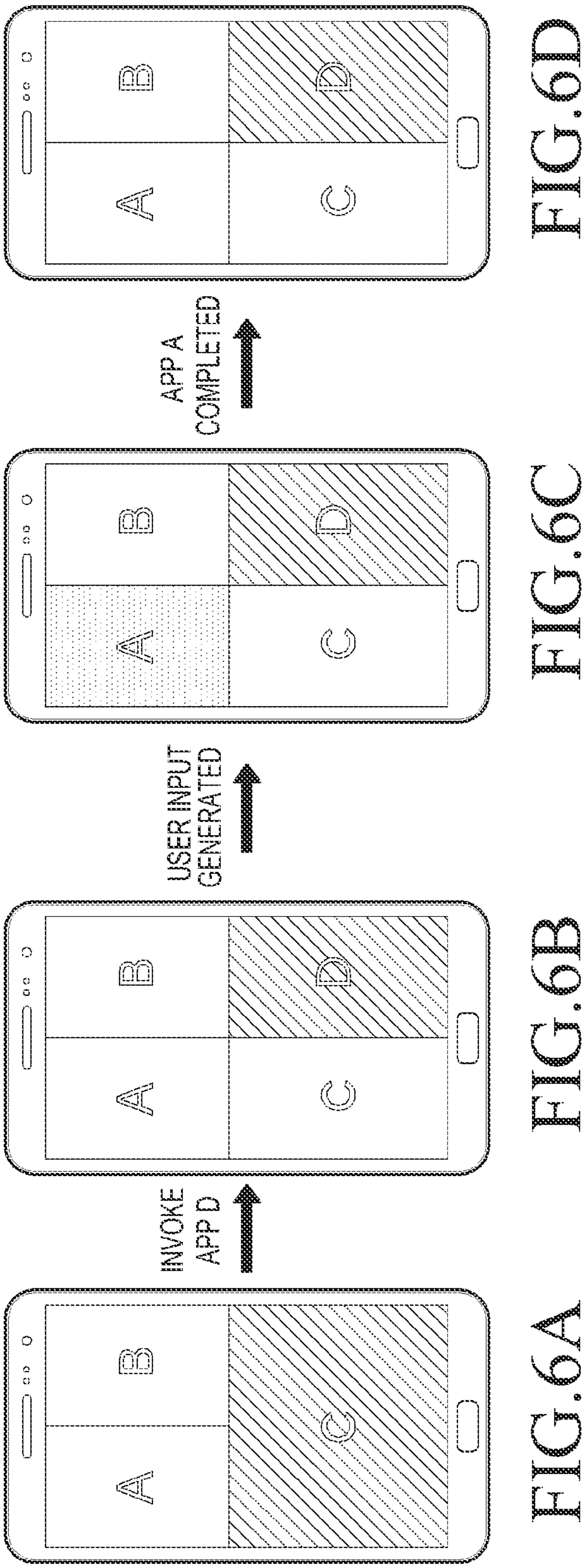
FIGS. 6A, 6B, 6C, and 6D are diagrams illustrating a task processing operation according to an embodiment of the present disclosure.

As illustrated in FIG. 6A, the electronic device 100 may simultaneously execute applications A B, and C, and applications A, B, and C may be displayed in respective windows in which they are executed.

FIG. 6B illustrates an example in which when the user additionally executes application D, the electronic device 100 invokes application D and additionally displays a window for executing application D. FIG. 6B also illustrates that the electronic device 100 executes a task in the added application D.

While the electronic device 100 is executing the task in application D as illustrated in FIG. 6B, the electronic device 100 may acquire a user input related to application A. In this case, the electronic device 100 may not be able to immediately determine which application is related to the acquired user input from among the plurality of applications being executed in the electronic device 100. Instead, the electronic device 100 may determine a first application related to the user input by performing the determination operations described herein above with reference to FIG. 3

FIG. 6C is a diagram illustrating an example in which the electronic device 100 determines that the user input is related to application A and executes a task corresponding to the user input in application A. The electronic device 100 may execute the task corresponding to the user input in application A without performing a procedure for selecting application A.

FIG. 6D is a diagram illustrating an example in which, after the electronic device 100 executes the task corresponding to the user input in application A, the electronic device 100 maintains execution of the task executed through application D. In this manner, the electronic device 100 may execute the task in application A without discontinuing execution of the task in application D.

Figures 7A, 7B, 7C:
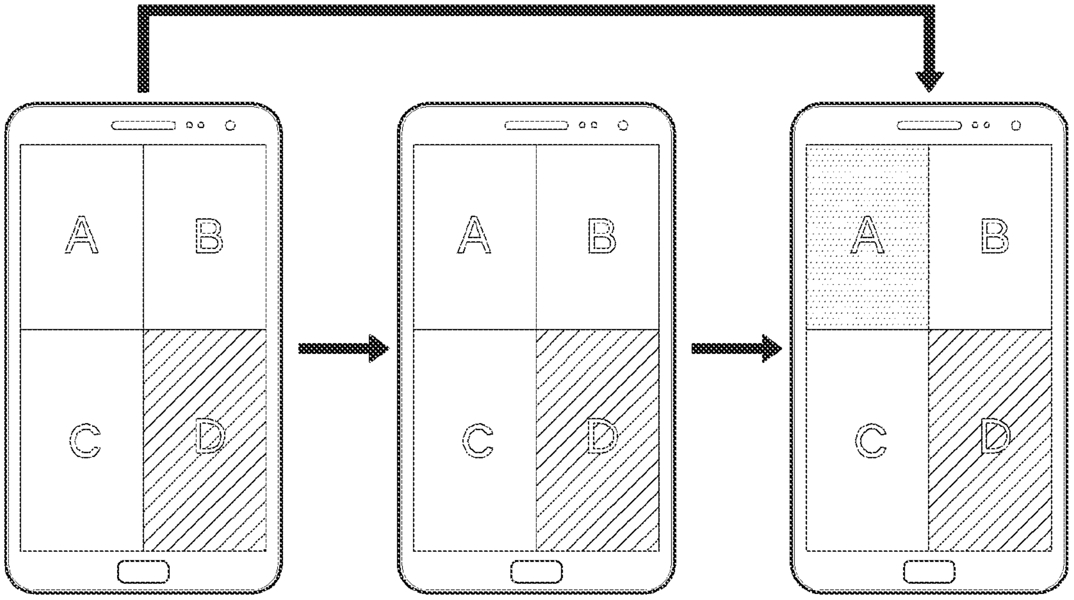
FIGS. 7A, 7B, and 7C are diagrams illustrating an operation for processing a task using an application selected by a user according to an embodiment of the present disclosure.

FIGS. 7A-7C are diagrams illustrating an operation for processing a task in an application selected by a user according to an embodiment of the present disclosure.

As illustrated in FIG. 7A, the electronic device 100 may execute applications A, B, C, and D, and display these applications in respective windows. A user input related to one of applications A, B, C, and D may be acquired through the electronic device 100.

As described herein above with reference to FIGS. 5 and 6, if the electronic device 100 is able to determine application A related to the user input, the electronic device 100 may execute a task corresponding to the user input in application A, as illustrated in FIG. 7C.

However, if it is not possible to determine application A related to the user input, the electronic device 100 may output voice for selection of the first application through the speaker so that the user may select the first application, as illustrated in FIG. 7B.

If a voice for selecting the first application is output through the electronic device 100, the user may select the first application from among applications A, B, and C by providing a voice input. The electronic device 100 may acquire the voice input from the user and determine the first application based on the voice input.

For example, the electronic device 100 may output a voice prompting the user to select one of applications A, B, and C as the first application in FIG. 7B. Upon hearing the voice output from the electronic device 100, the user may provide a voice input 'application A' to the electronic device 100 to select application A as the first application. The electronic device 100 may determine application A to be the first application based on the voice input received from the user. Subsequently, the electronic device 100 may execute a task corresponding to the user input in application A, as illustrated in FIG. 7C.

In the example of FIGS. 7A-C, the electronic device 100 receives an additional voice input from the user. However, the additional voice input is merely used by the electronic device 100 in order to determine an application related to a user input, rather than being used to directly select application A. Accordingly, the electronic device 100 may also execute a task corresponding to the user input in application A, without performing a separate procedure for selecting application A, while keeping a task executed in application D in FIG. 7.

Figures 8A, 8B, 8C:
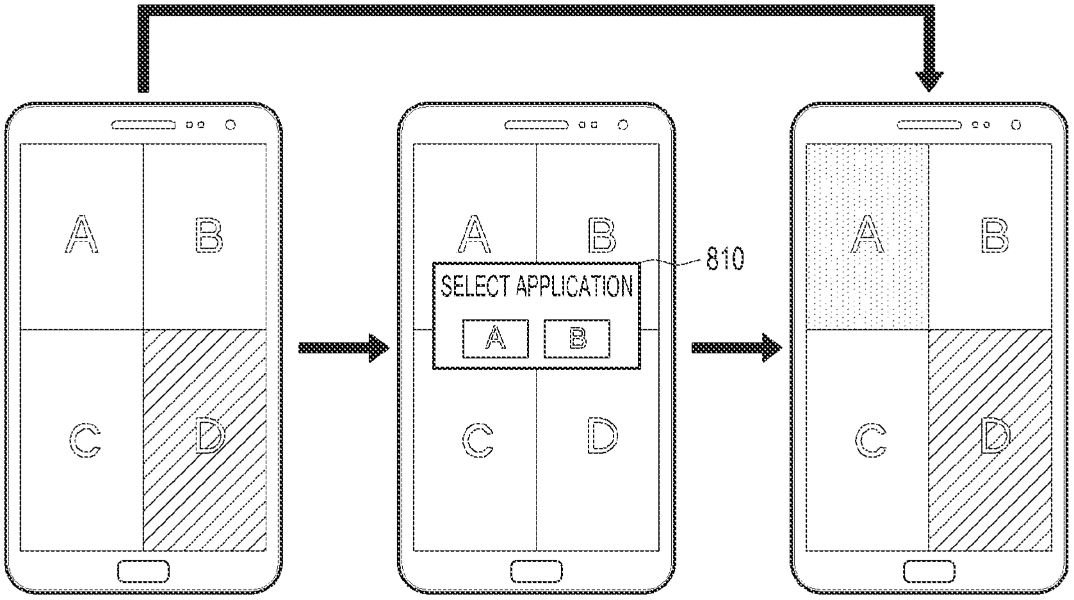
FIGS. 8A, 8B, and 8C are diagrams illustrating an operation for processing a task by providing a pop-up window that enables selection of a first application according to an embodiment of the present disclosure.

FIGS. 8A-8C are diagrams illustrating an operation for processing a task by providing a pop-up window that enables selection of a first application according to an embodiment of the present disclosure.

Referring to FIGS. 8A-8C, if the electronic device 100 is able to determine a first application related to an acquired user input, the electronic device 100 may execute a task corresponding to the user input in application A, as illustrated in FIG. 8C.

As shown in the example of FIGS. 7A-7C, however, the electronic device 100 might not be able to immediately determine an application related to an acquired user input during execution of applications A, B, C, and D, as illustrated in FIG. 8A.

When such a determination is not possible, the electronic device 100 displays a pop-up window 810 prompting the user to select a first application, instead of a voice output through the speaker, in order to receive a selection of the first application related to the user input in FIG. 8B, as compared to FIGS. 7A-7C.

When the pop-up window 810 is displayed in the electronic device 100, the user may select the first application in the pop-up window 810. The electronic device 100 may determine the first application based on the input acquired through the pop-up window 810.

For example, to select application A as the first application, the user may touch an icon representing application A displayed in the pop-up window 810. The electronic device 100 may determine application A to be the first application based on the touch input on the icon representing application A. Subsequently, the electronic device 100 may execute a task corresponding to the user input in application A, as illustrated in FIG. 8C.

FIGS. 8A-8C illustrate an example in which the electronic device 100 receives an additional touch input from the user through the pop-up window 810. As in the illustrated case of FIG. 7, however, the additional touch input is merely used by the electronic device 100 to determine an application related to a user input, rather than used to directly select application A. Accordingly, the electronic device 100 may also execute a task corresponding to the user input in application A without performing a procedure for selecting application A, while keeping a task executed through application D in FIG. 8.

Figure 9A:
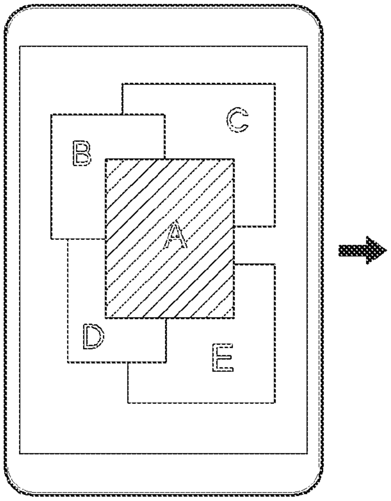
FIGS. 9A, 9B, and 9C are diagrams illustrating a task processing operation according to an embodiment of the present disclosure.
Figure 9B:
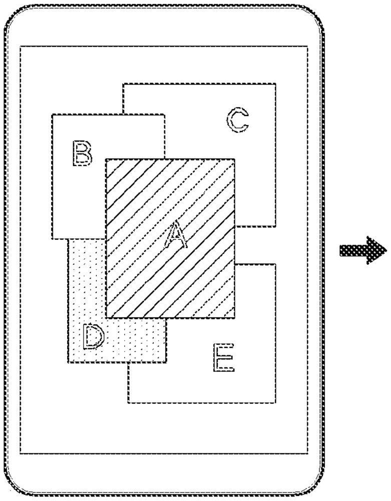
Figure 9C:
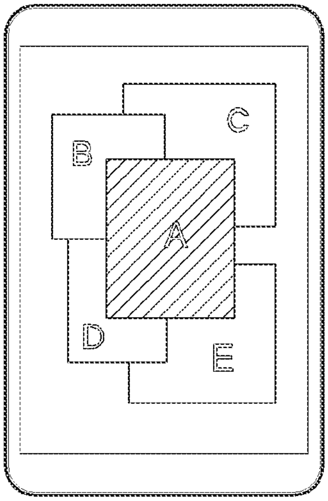

FIGS. 9A-9C are diagrams illustrating a task processing operation according to an embodiment of the present disclosure.

While the electronic device 100 may divide the area of the display and display windows for executing a plurality of applications separately in the divided areas so that the windows may not overlap with each other as illustrated in FIGS. 5A to 8C, the electronic device 100 may display the windows for executing the plurality of applications in such that the windows may at least partially overlap with each other.

As illustrated in FIG. 9A, the electronic device 100 may display windows in which applications A, B, C, and D are being executed, overlapped with one another according to their display priority levels. The window for executing application A, in which an ongoing task is being executed, may be assigned a higher priority level than any other executed window, and thus displayed at a foremost position. During execution of the task in application A, the electronic device 100 may acquire a user input related to application D, and the electronic device 100 may determine which application is related to the acquired user input from among the plurality of applications being executed in the electronic device 100. The electronic device 100 may determine a first application related to the user input in the determination operation illustrated in FIG. 3.

FIG. 9B is a diagram illustrating an example in which the electronic device 100 determines that the user input is related to application D and executes a task corresponding to the user input in application D. In this manner, the electronic device 100 may not perform a procedure for selecting application D, displaying application D at a foremost position relative to the other applications by changing the display priority levels of the applications, and then executing a task, in order to execute the task corresponding to the user input in application D.

FIG. 9C is a diagram illustrating an example in which after the electronic device 100 executes the task corresponding to the user input in application D, the electronic device 100 maintains execution of the task in application A. In this manner, the electronic device 100 may execute the task in application D, while maintaining the task executed in application A.

Figure 10A:
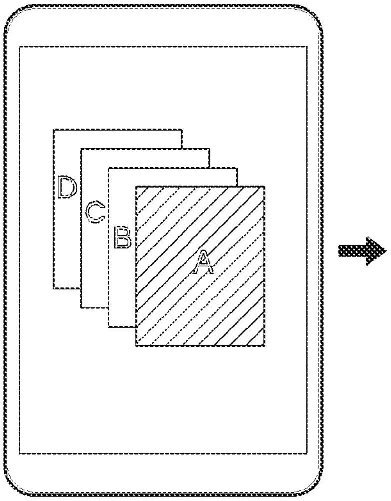
FIGS. 10A, 10B, and 10C are diagrams illustrating a task processing operation according to an embodiment of the present disclosure.
Figure 10B:
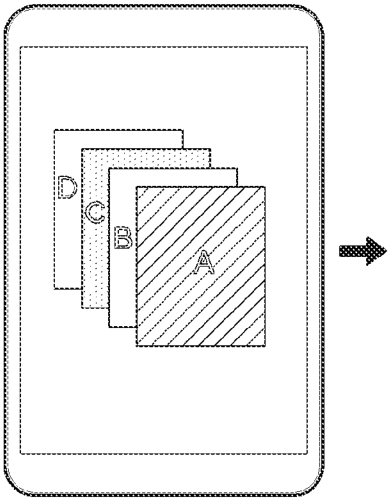
Figure 10C:
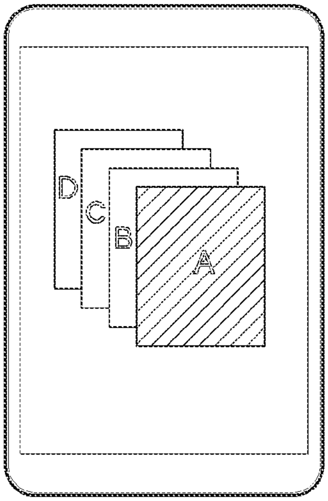

FIGS. 10A-10C are diagrams illustrating a task processing operation according to an embodiment of the present disclosure.

The electronic device 100 may display windows for executing a plurality of applications in a cascade stack. As illustrated in FIG. 10A, the electronic device 100 may display windows for executing applications A, B, C, and D, arranged in a cascade stack. During execution of a task in application A, the electronic device 100 may acquire a user input related to application C, and the electronic device 100 may determine which application is related to the acquired user input from among the plurality of applications being executed in the electronic device 100. The electronic device 100 may determine a first application related to the user input in the determination operation illustrated in FIG. 3.

FIG. 10B is a diagram illustrating an in which the electronic device 100 determines that the user input is related to application C and executes a task corresponding to the user input in application C. In this manner, the electronic device 100 may not perform a procedure for selecting application C, displaying application C at a foremost position relative to the other applications, and then executing a task, in order to execute the task corresponding to the user input through application C.

FIG. 10C is a diagram illustrating an example in which, after the electronic device 100 executes the task corresponding to the user input in application C, the electronic device 100 keeps executing the task in application A. In this manner, the electronic device 100 may execute the task in application C, while maintaining execution of the task of application A.

Figure 11:
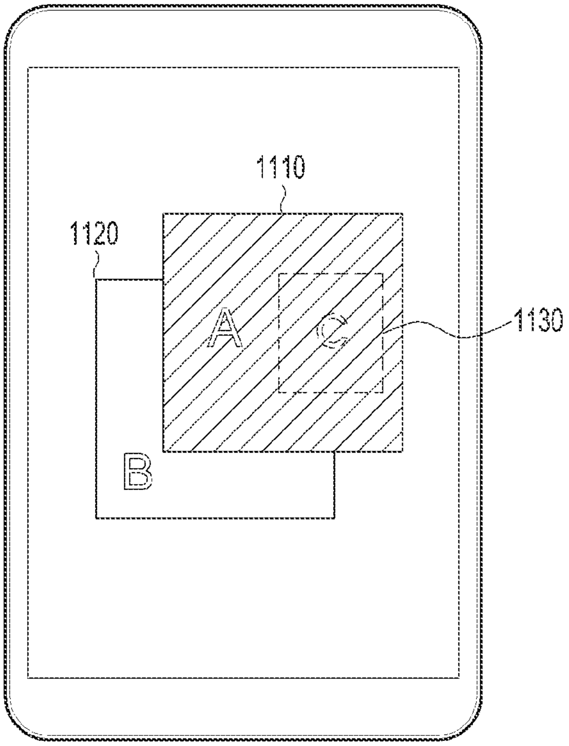
FIG. 11 illustrates a screen displayed on an electronic device according to an embodiment of the present disclosure.

FIG. 11 is a diagram illustrating a screen displayed on an electronic device according to an embodiment of the present disclosure.

FIG. 11 illustrates an example in which windows for executing application A 1110, application B 1120, and application C 1130 are displayed as overlapped on each other according to their display priority levels. Application B 1120 may be displayed as partially overlapping with application A 1110 and application C 1130 may be displayed as being fully overlapped by application A.

If the electronic device 100 acquires a user input related to application C 1130, the electronic device 100 may determine which application is related to the user input from among the plurality of applications. The electronic device 100 may execute a task corresponding to the user input in application C 1130, determining that the user input is related to application C 1130.

As described before with reference to FIGS. 9A-9C and 10A-10C, the electronic device 100 may not perform a procedure for directly selecting an application C 1130, displaying application C at a foremost position relative to the other applications, and then executing a task corresponding to application C, in order to execute application C. However, even though application C 1130 is fully overlapped by application A and thus is not displayed on the electronic device 100, as illustrated in FIG. 11, the electronic device 100 may execute a task corresponding to the user input in application C 1130.

Figure 12B:
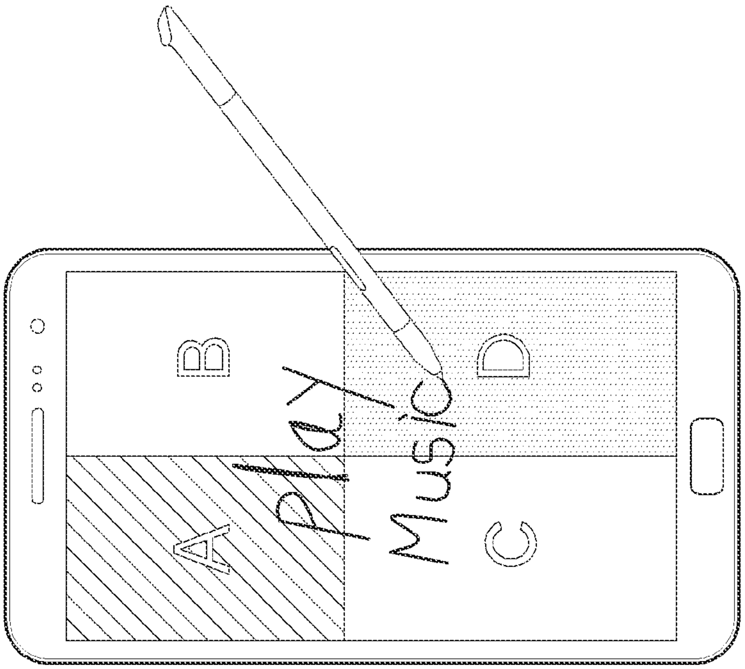
FIGS. 12A and 12B are diagrams illustrating an electronic device that processes a task through a pen input according to an embodiment of the present disclosure.
Figure 12A:
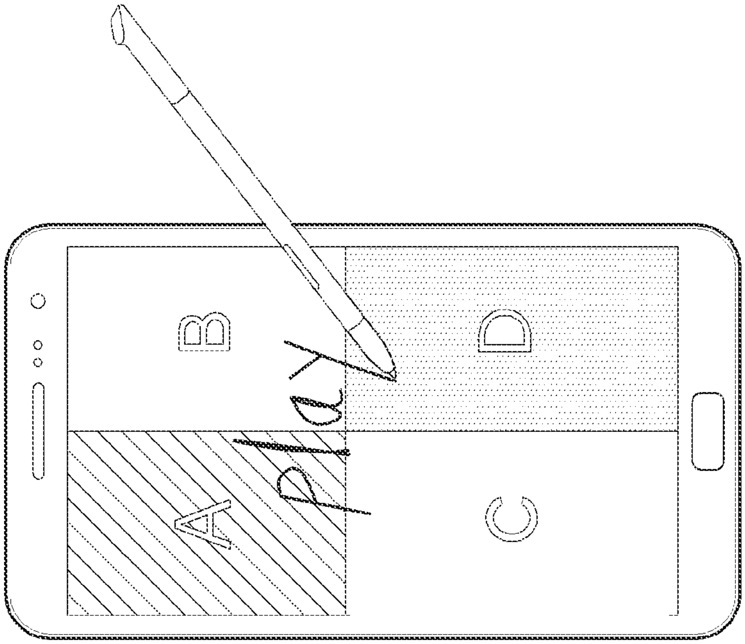

FIGS. 12A and 12B are diagrams illustrating an electronic device that processes a task through a pen input according to an embodiment of the present disclosure.

Referring to FIG. 12A, the electronic device 100 may acquire a pen input from the user during execution of a task in application A. The user may apply a pen input for executing an application other than application A to the electronic device 100.

The electronic device 100 may determine which application is related to the pen input from among a plurality of applications being executed. If the electronic device 100 determines that the pen input is related to application D, the electronic device 100 may execute a task corresponding to the pen input in application D, while maintaining execution of the task performed with respect to application A.

The user may apply an additional input indicating a predetermined application along with the pen input. The electronic device 100 may determine the predetermined application indicated by the additional input to be a first application.

For example, the user may apply a pen input ‘PLAY’ and then an additional input ‘MUSIC’, as illustrated in FIG. 12B. ‘MUSIC’ may be a predetermined input indicating a music player application. The electronic device 100 may determine application D, which is the music player application in the present example, indicated by the additional input ‘MUSIC’ to be the first application. Then, the electronic device 100 may execute a task corresponding to the pen input ‘PLAY’ in application D.

Figures 13A, 13B:
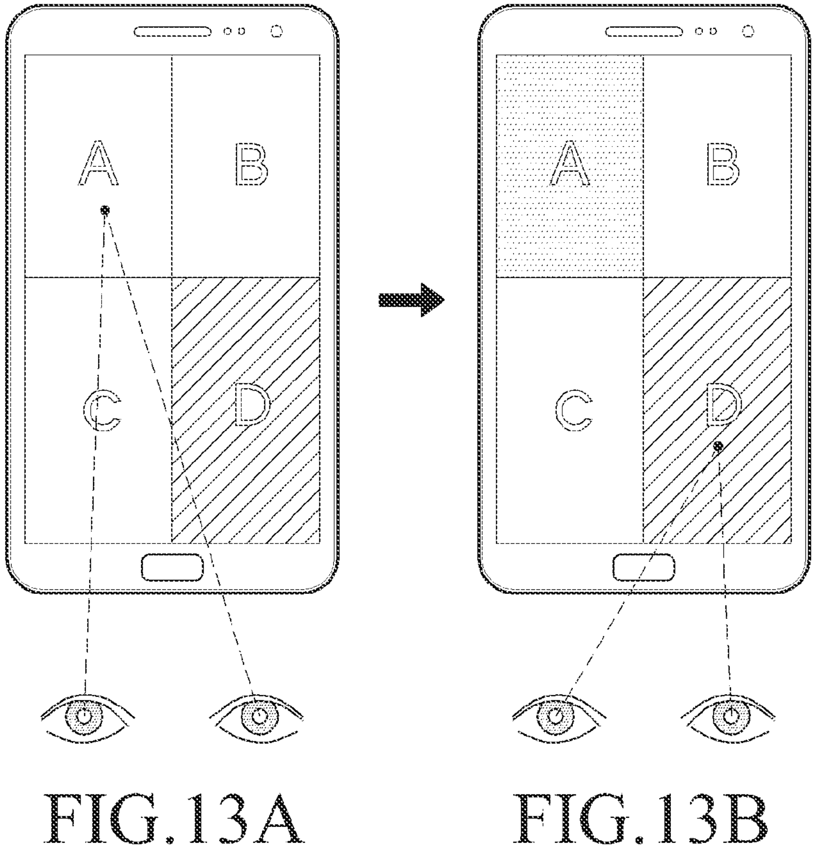
FIGS. 13A and 13B are diagrams illustrating an operation for processing a task by tracking the eyes of a user according to an embodiment of the present disclosure.

FIGS. 13A and 13B are diagrams illustrating an operation for processing a task by tracking the eyes of a user according to an embodiment of the present disclosure.

Referring to FIGS. 13A and 13B, the electronic device 100 may determine a first application related to an acquired user input from among a plurality of applications being executed by tracking the eyes of a user through a camera.

For example, the electronic device 100 may acquire a user input for executing an application other than application A, while detecting that application A is being looked at by the user, as illustrated in FIG. 13A.

The electronic device 100 may determine application A, which is detected as being looked at by the user, to be the first application. Subsequently, the electronic device 100 may execute a task corresponding to the user input in application A, as illustrated in FIG. 13B.

However, the electronic device 100 may determine the first application based on detection histories of applications detected to have been looked at by the user for at least a predetermined time period, in order to determine the first application more accurately, as described herein above with reference to FIG. 4.

Figure 14:
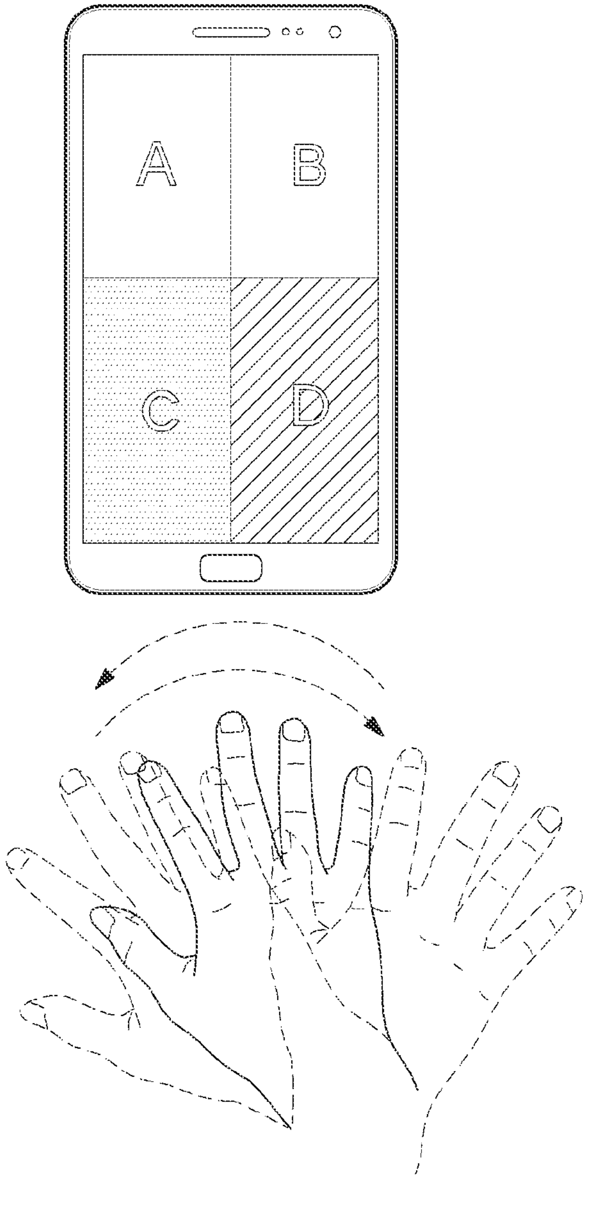
FIG. 14 is a diagram illustrating an electronic device that processes a task through a gesture input according to an embodiment of the present disclosure.

FIG. 14 is a diagram illustrating an electronic device that processes a task through a gesture input according to an embodiment of the present disclosure.

Referring to FIG. 14, the electronic device 100 may acquire a gesture input from the user during execution of a task in application D. The user may apply the gesture input for executing an application other than application D to the electronic device 100.

The electronic device 100 may determine which application is related to the gesture input from among a plurality of applications being executed. If the electronic device 100 determines that the touch input is related to application C, the electronic device 100 may execute a task corresponding to the pen input in application C, while maintaining execution of the task of application D.

Figure 15:
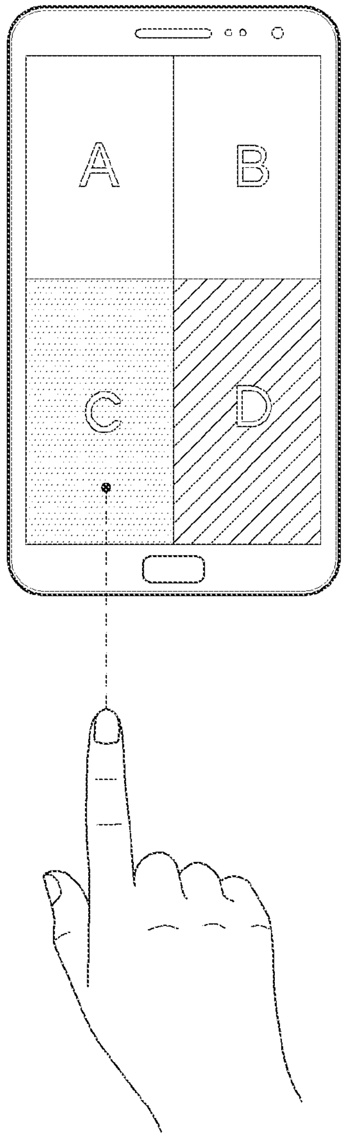
FIG. 15 is a diagram illustrating an electronic device that processes a task through a gesture input according to an embodiment of the present disclosure.

FIG. 15 is a diagram illustrating an electronic device that processes a task through a gesture input according to an embodiment of the present disclosure.

The user may apply an additional input indicating a predetermined application along with the gesture input illustrated in FIG. 14. For example, the user may apply a gesture input indicating a specific application, as an additional input. As illustrated in FIG. 15, the user may apply a gesture input indicating application C as an additional input.

The electronic device 100 may determine application C to be the first application based on the additional input indicating application C. Accordingly, the electronic device 100 may execute a task corresponding to the gesture input in application C.

Although in the example described herein above with reference to FIG. 15, an additional input is a gesture input, this example does not limit embodiments of the present disclosure. The user may apply a pen input, a voice input, or the like as an additional input along with a gesture input.

Figure 16:
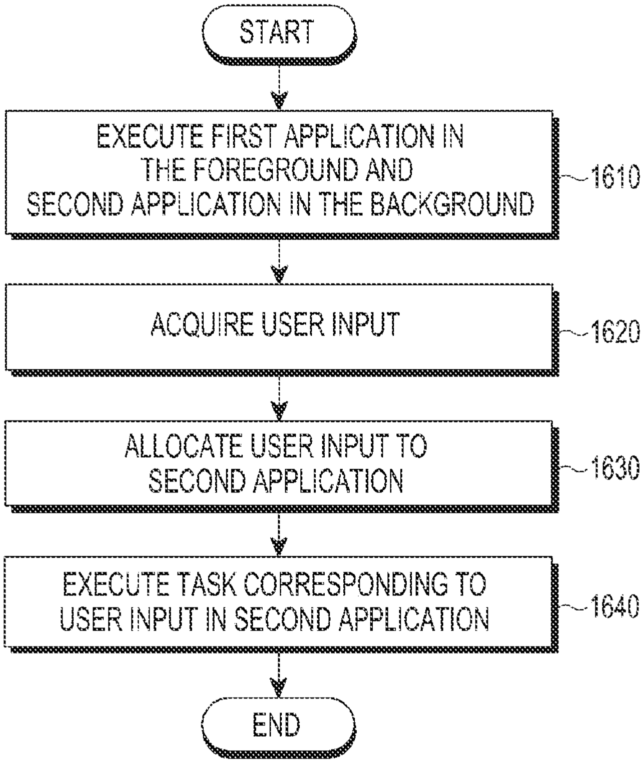
FIG. 16 is a flowchart illustrating a method for controlling an electronic device according to an embodiment of the present disclosure.

FIG. 16 is a flowchart illustrating a method for controlling an electronic device according to an embodiment of the present disclosure.

Referring to FIG. 16, the electronic device 100 executes a first application in the foreground and a second application in the background, in step 1610. To execute a plurality of applications, the electronic device 100 may execute the first application, in which an ongoing task is executed, in the foreground and the second application, in which a task is not currently being executed, in the background.

In step 1620, the electronic device 100 acquires a user input for executing a task in the second application. The user input may be of a different type from an input type supported by the first application. For example, if the first application supports a touch input, the user input may be of a different type, such as a voice input, a gesture input, or a pen input, for example. Further, even though the first application supports a touch input and a voice input, if an input corresponding to the ongoing task is a touch input, the user input may include a voice input. This form of input is performed so as not to affect the task being executed in the first application.

In step 1630, the electronic device 100 allocates the user input to the second application. Because the user input is applied to execute a task in the second application, the electronic device may allocate the user input to the second application. If there is a plurality of second applications, the electronic device 100 may determine an application related to the user input before allocating the user input to a second application. The electronic device 100 may determine the application related to the user input by performing the determination operation illustrated in and described with reference to FIG. 3.

In step 1640, the electronic device 100 executes a task corresponding to the user input in the second application in the background. As the task corresponding to the user input is executed in the background, the ongoing task may be maintained without interruptions in the first application in the foreground.

Figure 17A:
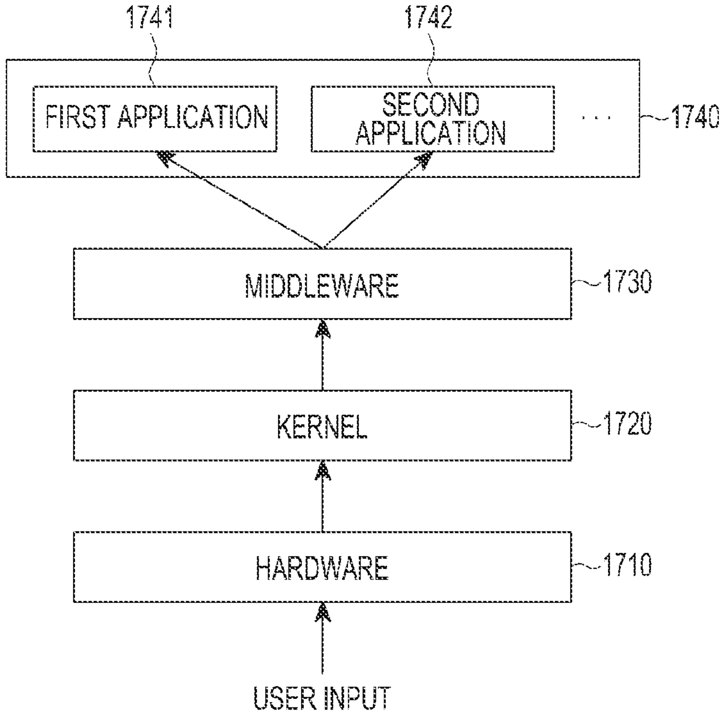
FIGS. 17A and 17B are diagrams illustrating an operation for providing a user input and a task stack for each of a plurality of applications according to an embodiment of the present disclosure.
Figure 17B:
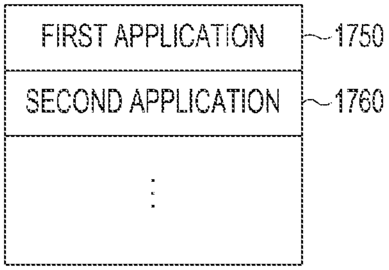

FIGS. 17A and 17B are diagrams illustrating an operation for providing a user input and a task stack for each of a plurality of applications according to an embodiment of the present disclosure.

Referring to FIG. 17A, a user input acquired through hardware 1710, such as an input device, may be transmitted to middleware 1730 through a kernel 1720. The middleware 1730 may provide the user input to an application with a task stack having a highest priority level according to the priority levels of the task stacks of applications.

Referring to FIG. 17B, a task stack 1750 of the first application may have priority over a task stack 1760 of a second application, and the middleware 1730 may provide an acquired user input to an application 1740 based on the task stacks. For example, the middleware 1730 provides the user input to a first application 1741 having a higher task priority level than a second application 1742, the first and second applications 1741 and 1742 being included in applications 1740, and executes a task in the first application 1741.

According to an embodiment of the present disclosure, an application related to an acquired user input may be determined. Thus, a task corresponding to the user input may be executed in the application related to the user input, while a task of an ongoing application is maintained.

For example, if an acquired user input is related to the second application 1742, even though the task stack 1760 of the second application 1742 has a lower priority level than the task stack 1750 of the first application 1741, the middleware 1730 may provide the acquired user input to the second application 1742. Even though the priority level of the task stack of the second application 1742 has not changed according to user selection of the second application 1742, the application related to the user input may be determined and thus the user input may be provided to the second application 1742 having a lower-priority task stack.

Figure 18A:
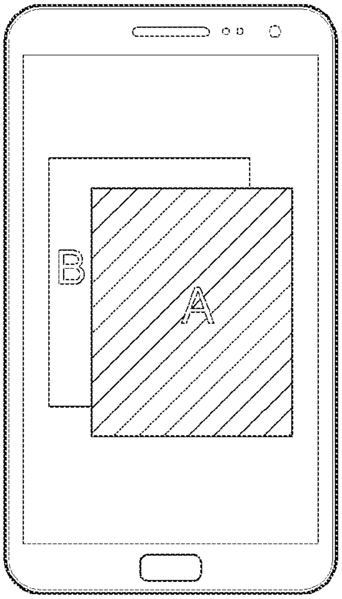
FIGS. 18A and 18B are diagrams illustrating an electronic device for displaying a pop-up window that indicates a result of task processing according to an embodiment of the present disclosure.
Figure 18B:
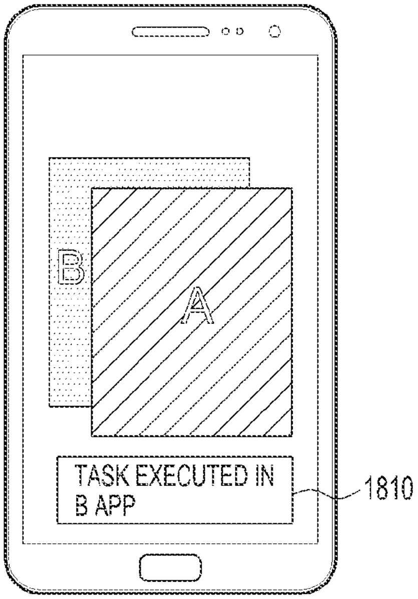

FIGS. 18A and 18B illustrate an electronic device for displaying a pop-up window that indicates a result of task processing according to an embodiment of the present disclosure.

Referring to FIG. 18A, the electronic device 100 may acquire a user input related to application B during execution of application A and application B. In response to the user input, the electronic device 100 may execute a task corresponding to the user input in application B, determining that application B is a first application related to the user input.

Referring to FIG. 18B, the electronic device 100 may display a result of executing the task in application B on a separate pop-up window 1810. Thus, the user may be aware that the task corresponding to the user input has been executed in application B. The electronic device 100 may visually indicate that the task has been executed in application B on a pop-up window, as illustrated in FIG. 18B, or by a voice signal through the speaker.

According to an embodiment of the present disclosure, a method for controlling an electronic device that executes a plurality of applications may include determining a first application related to an acquired user input from among the plurality of applications, and executing a task corresponding to the user input in the first application.

The user input may include at least one of a voice input, a gesture input, and a pen input.

Determination of the first application may include determining the first application using a stored database in which user inputs are mapped to tasks executable in each of the plurality of applications.

Determination of the first application may include detecting an application looked at by a user among the plurality of applications by tracking the eyes of the user.

Determination of the first application may include determining an application detected to have been looked at by the user while acquiring the user input from among the plurality of applications to be the first application.

Determination of the first application may further include storing detection histories of applications detected to have been looked at by the user for at least a predetermined time period.

Determination of the first application may include determining an application detected the greatest number of times to have been looked at by the user from among the plurality of applications based on the detection history of the application to be the first application.

Determination of the first application may further include acquiring an additional input indicating a predetermined application at the time of acquiring the user input.

Determination of the first application may include determining the predetermined application indicated by the additional input to be the first application.

The method may further include, if the first application related to the user input is not determined, displaying a pop-up window for selecting the first application related to the user input to the user.

Determination of the first application may include determining an application selected in the pop-up window by the user to be the first application.

According to another embodiment of the present disclosure, an electronic device may include a touch screen configured to display a plurality of applications being executed, and a controller configured to determine a first application related to an acquired user input from among the plurality of applications, and to control execution of a task corresponding to the user input in the first application.

The user input may include at least one of a voice input, a gesture input, and a pen input.

The controller may determine the first application using a stored database in which user inputs are mapped to tasks executable in each of the plurality of applications.

The electronic device may further include a camera configured to capture a facial image of the user, and the controller may track the eyes of the user based on the captured facial image of the user and detect an application looked at by the user among the plurality of applications.

The controller may determine an application detected to have been looked at by the user while acquiring the user input from among the plurality of applications to be the first application.

The controller may control storing of detection histories of applications detected to have been looked at by the user for at least a predetermined time period.

The controller may determine an application detected the greatest number of times to have been looked at by the user from among the plurality of applications based on the detection history of the application to be the first application.

The controller may acquire an additional input indicating a predetermined application at the time of acquiring the user input.

The controller may determine the predetermined application indicated by the additional input to be the first application.

If the first application related to the user input is not determined, the controller controls display of a pop-up window for selecting the first application related to the user input to the user.

The controller may determine an application selected in the pop-up window by the user to be the first application.

According to another embodiment of the present disclosure, a method for controlling an electronic device that executes a plurality of applications may include executing a first application in the foreground, executing a second application in the background, acquiring a user input, and executing a task corresponding to the user input in the second application in the background.

The user input may be of a different type from an input type supported by the first application.

The method may further include allocating the acquired user input to the second application.

According to another embodiment of the present disclosure, an electronic device may include a touch screen configured to display a first application being executed in the foreground and a second application being executed in the background, and a controller configured to acquire a user input and to control execution of a task corresponding to the user input in the second application in the background.

The user input may be of a different type from an input type supported by the first application.

The controller may allocate the acquired user input to the second application.

As is apparent from the foregoing description of various embodiments of the present disclosure, an electronic device can execute an application intended by a user by determining an application related to a user input.

According to various embodiments of the present disclosure, the electronic device can execute a task in another application without discontinuing an ongoing task in one application.

As a consequence, there is no need for repeating an operation for selecting another application and executing a selected task, in order to execute a task in another application. Therefore, a fast and convenient device manipulation environment can be provided to a user.

Each of the components of the electronic device described above according to the present disclosure may include one or more components, and each component's name may vary according to the type of the electronic device. The electronic device according to various embodiments of the present disclosure may include at least one of the above-described components, and some may be omitted or additional components may be included. Also, some of the components of the electronic device according to various embodiments of the present disclosure may be combined into a single entity and perform functions identical to those of the respective components before their combination.

The term "module", as used herein, may include its ordinary definition including, for example, a single unit, or a combination of two or more units. The term "module" may be used interchangeably with terms such as, for example, "unit", "logic", "logical block", "component", or "circuit". A module may be the smallest unit for performing one or more functions, or a portion thereof. A module may be implemented mechanically, or electronically. For example, a module may include at least one of a known, or to-be-developed, application-specific integrated circuit (ASIC) chip, field-programmable gate array (FPGA) or programmable logic device that perform certain operations.

At least a part of devices (e.g., modules or their functions) or methods according to various embodiments of the present disclosure may be implemented as commands stored in a computer-readable storage medium, in the form of a programming module. When the commands are executed by a processor, one or more processors may execute functions corresponding to the commands. The computer-readable storage medium may be, for example, the memory 130.

The computer-readable medium may include a hard disk, a floppy disk, tape, magnetic media (e.g., magnetic tape), optical media (e.g., compact disc read-only memory (CD-ROM)), a digital versatile disc (DVD), magneto-optical media (e.g., floptical disk), hardware devices (e.g., read-only memory (ROM), random access memory (RAM) or flash memory)), and the like. Program instructions may include machine language code that are produced by a compiler or high-level language code that may be executed by a computer using an interpreter. The functionalities of hardware discussed above may be implemented as one or more software modules, and vice versa in order to perform an operation according to various embodiments.

A module or a programming module according to various embodiments of the present disclosure may include one or more of the above-described components, may omit a portion thereof, or may include additional components. Operations that are performed by a module, a programming module or other components according to the present disclosure may be processed in a serial, parallel, repetitive or heuristic manner, and some operations may be omitted or additional operations may be added.

According to various embodiments, a storage medium storing commands is provided. The commands are configured to allow at least one processor to perform at least one operation, when the commands are executed by the at least one processor. The at least one operation may include determining a first application related to an acquired user input from among a plurality of applications, and executing a task corresponding to the user input in the first application.

While the disclosure has been shown and described with reference to certain embodiments thereof, it will be understood by those skilled in the art that various changes in form and details may be made therein without departing from the spirit and scope of the disclosure as defined by the appended claims and their equivalents.

What is claimed is:

1. A method for controlling an electronic device that executes a plurality of applications, the method comprising:

displaying a first execution screen of a first application and a second execution screen of a second application different from the first application;

receiving a user input for performing a specific task, wherein the specific task is executable by both of the first application and the second application;

tracking an eye movement of a user for identifying an execution screen of an application to execute the specific task corresponding to the user input between the displayed first execution screen and the displayed second execution screen;

based on the tracked eye movement, identifying the execution screen looked at by the user between the displayed first execution screen and the displayed second execution screen; and executing the specific task corresponding to the user input by the application of the identified execution screen.

2. The method of claim 1, further comprising identifying the specific task to be executed using a stored database in which user inputs are mapped to tasks executable by each of the plurality of applications.

3. The method of claim 1, further comprising storing detection histories of the plurality of applications detected to have been looked at by the user for at least a predetermined time period.

4. The method of claim 3, wherein the identifying of the execution screen looked at by the user further comprises identifying the execution screen detected a greatest number of times to have been looked at by the user from among the plurality of applications looked at by the user for at least the predetermined time period based on the detection histories of the plurality of applications.

5. The method of claim 1, further comprising receiving an additional input indicating a predetermined application while receiving the user input.

6. The method of claim 5, further comprising identifying the predetermined application indicated by the additional input to be the application to execute the specific task.

7. The method of claim 1, further comprising:

displaying a pop-up window for receiving a selection of the first application or the second application by which the specific task is to be executed based on the user input.

8. The method of claim 7, further comprising identifying an application selected in the pop-up window by the user to be the application to execute the specific task.

9. An electronic device comprising:

a touch screen;

a camera; and a controller configured to:

control the touch screen to display a first execution screen of a first application and a second execution screen of a second application different from the first application, receive a user input for performing a specific task, wherein the specific task is executable by both of the first application and the second application, track, by using the camera, an eye movement of a user for identifying an execution screen of an application to execute the specific task corresponding to the user input between the displayed first execution screen and the displayed second execution screen, based on the tracked eye movement, identify the execution screen looked at by the user between the displayed first execution screen and the displayed second execution screen, and execute the specific task corresponding to the user input by the application of the identified execution screen.

10. The electronic device of claim 9, wherein the controller is further configured to identify the specific task to be executed using a stored database in which user inputs are mapped to tasks executable by each of a plurality of applications.

11. The electronic device of claim 9, wherein the camera is configured to capture a facial image of the user, and wherein the controller is further configured to track the eye movement of the user based on the captured facial image of the user.

12. The electronic device of claim 11, wherein the controller is further configured to control storing of detection histories of a plurality of applications detected to have been looked at by the user for at least a predetermined time period.

13. The electronic device of claim 12, wherein the controller is further configured to identify the execution screen detected a greatest number of times to have been looked at by the user from among the plurality of applications looked at by the user for at least the predetermined time period based on the detection histories of the plurality of applications.

14. The electronic device of claim 9, wherein the controller is further configured to receive an additional input indicating a predetermined application while receiving the user input.

15. The electronic device of claim 14, wherein the controller is further configured to identify the predetermined application indicated by the additional input to be the application to execute the specific task.

16. The electronic device of claim 9, wherein, the controller is further configured to control display of a pop-up window for receiving a selection of the first application or the second application by which the specific task is to be executed based on the user input.

17. The electronic device of claim 16, wherein the controller is further configured to identify an application selected in the pop-up window by the user to be the application to execute the specific task.

18. A method for controlling an electronic device that executes a plurality of applications, the method comprising:

executing a first application in a displayed first execution screen in a foreground and executing a second application in a displayed second execution screen in a background, wherein the second application is different from the first application;

receiving a user input for performing a specific task, wherein the specific task is executable by both of the first application and the second application;

tracking an eye movement of a user for identifying an execution screen of an application to execute the specific task corresponding to the user input between the displayed first execution screen and the displayed second execution screen;

based on the tracked eye movement, identifying the execution screen looked at by the user between the displayed first execution screen and the displayed second execution screen; and executing the specific task corresponding to the user input by the application of the identified execution screen.

19. The method of claim 18, further comprising allocating the received user input to the second application.

20. An electronic device comprising:

a touch screen;

a camera; and a controller configured to:

control the touch screen to display a first execution screen of a first application being executed in a foreground and a second execution screen of a second application being executed in a background, wherein the second application is different from the first application, receive a user input for performing a specific task, wherein the specific task is executable by both of the first application and the second application, track, by using the camera, an eye movement of a user for identifying an execution screen of an application to execute the specific task corresponding to the user input between the displayed first execution screen and the displayed second execution screen, based on the tracked eye movement, identify the execution screen looked at by the user between the displayed first execution screen and the displayed second execution screen, and execute the specific task corresponding to the user input by the application of the identified execution screen.

21. The electronic device of claim 20, wherein the controller allocates the received user input to the second application.

* * * * *